United States Patent Office 2,726,485
Patented Dec. 13, 1955

2,726,485

INOCULANT FOR MAKING PLANTS REPELLENT TO INSECTS AND THE LIKE AND THE METHOD OF EMPLOYING THE SAME

Dabney A. Thomas, Columbus, Miss., assignor to Virgie M. Thomas, Columbus, Miss.

No Drawing. Application February 29, 1952, Serial No. 274,289

9 Claims. (Cl. 47—58)

This invention relates to an inoculant for making plants repellent to insects and the like and the method of employing the same by treating the seeds of the plants before planting or by treating the growing plants.

A more specific object of my invention is to provide a method of making plants repellent to insects and the like by inoculating the seeds of the plants to be made repellent or the plant itself with an extract from the leaves, barks, or drupes of the chinaberry tree, or with an extract from the juices of blue lupines or privet. A still further object of my invention is to provide a simple and very economical method of making plants repellent to insects and the like by treating the seeds thereof, thus eliminating the necessity of having to spray or dust the growing plant.

Heretofore in the art to which my invention relates, plants have been made repellent to insects and the like by spraying or dusting the plant with an insecticide. These methods of applying an insecticide are objectionable for the reason that the spraying or dusting compounds are expensive and much labor and equipment is required to apply the insecticide to the plants. Also, the plants must be sprayed or dusted after each rain since the insecticide is easily washed off, thus incurring further expense. Furthermore, young plants are often attacked by insects such as aphids or lice and damaged to a great extent before the plants can be sprayed or dusted.

To overcome these and other difficulties, I have devised a method of making plants repellent to insects, worms and the like by inoculating the seeds of the plants before planting, with a substance which is toxic to insects, worms and the like. My improved inoculant may also be applied to growing plants in the form of a soil dressing. The plant is thus made repellent to insects and the like by taking up the inoculating substance from the soil.

Briefly my improved inoculant and method of making plants repellent to insects, worms and the like comprises forming a damp mixture of disintegrated leaves, drupes, or bark of the chinaberry tree and allowing the mixture thus formed to mold. Sufficient water is then added to the molded mixture to form a paste. The seeds to be inoculated are then embedded in the paste and allowed to remain there until sprouting of the seed is apparent. The seeds are then removed for planting. Also the seeds may be inoculated with an extract from blue lupines or privet.

In accordance with a preferred embodiment of my invention, I employ chinaberry, preferably the drupes of the chinaberry tree, as a starting material. However, the leaves and bark of the chinaberry tree may be used separately or mixed with the drupes as the starting material. About 16 parts by volume of disintegrated chinaberry is placed in a suitable container and approximately 1 part by volume of water is added to form a damp mixture. A small amount of ventilation is allowed by providing a perforated or loose fitting lid over the container. The dampened material is then allowed to mold at room temperature for a period of from 2 to 4 weeks.

The molding of the material is a very important feature of my invention. I have found in actual practice that if shorter molding periods are employed an inactive material will result. On the other hand, when the material is allowed to age for more than four weeks the resulting product prevents germination of the seeds. While I do not know just what prevents the germination of the seeds, it is believed that if the material is allowed to age more than four weeks it becomes toxic to the seeds or the concentration of the product is such as to prevent germination of the seeds.

At the end of the molding period, I preferably add sufficient water to the molded material to form a paste. The seeds to be treated are then imbedded in the paste for a period of 2 or 3 days or until sprouting of the seeds is apparent. The seeds are then removed for planting in the usual manner.

Instead of forming a paste of the molded material, the material may be used as a dressing for growing plants along with other ingredients added to the soil, such as fertilizer. Also the material may be applied to the soil in the form of a spray with or without other ingredients, such as a solution of a nitrogen compound.

From the foregoing it will be seen that I have provided an improved inoculant and method of employing the same so as to make plants repellent to various kinds of insects, worms and the like. I have found in actual practice that my inoculant is very effective in cotton plants to make them resistant to aphids, lice, cotton boll worms and the boll weevil. It will also be seen that my improved method is very economical to carry out and that there is no chance of the plant losing its repellency toward insects due to rain, thus making my method particularly adapted for use during wet seasons, when other forms of insecticides are ineffective.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A method of making plants repellent to insects by treating the seeds of the plants comprising the steps of, forming a damp mixture of water and a plant material selected from the group consisting of blue lupines, privet and chinaberry, aging the damp mixture for two to four weeks thus bringing about a molding of said mixture, adding water to the molded mixture to form a paste, embedding the seeds of the plants to be made repellent in said paste until sprouting thereof is apparent, and removing the seeds from the paste for planting.

2. A method of making plants repellent to insects by treating the seeds of the plants comprising the steps of, forming a mixture of approximately one part by volume of water and approximately 16 parts by volume of a plant material selected from the group consisting of blue lupines, privet and chinaberry, aging said mixture at approximately room temperature for two to four weeks thus bringing about a molding of said mixture, adding water to the aged mixture to form a paste, embedding the seeds of the plant to be made repellent in said paste until sprouting thereof is apparent, and removing the seeds from the paste for planting.

3. The method of making plants repellent to insects as defined in claim 2 in which the seeds are embedded in the paste for a period of two to three days.

4. A method of making growing plants repellent to insects comprising the steps of, forming a damp mixture of water and a plant material selected from the group consisting of blue lupines, privet and chinaberry, aging said mixture for two to four weeks thus bringing about a molding of said mixture, and applying the molded material as a dressing to the growing plant.

5. The method of making a growing plant repellent to insects as defined in claim 4 in which the molded material is blended with fertilizer and applied to the soil in which the plant is growing.

6. A method of making a growing plant repellent to insects comprising the steps of forming a damp mixture of water and a plant material selected from the group consisting of blue lupines, privet and chinaberry, aging said mixture at approximately room temperature for two to four weeks thus bringing about a molding of the same, forming a water extract of the molded mixture which is capable of being absorbed by said growing plant, and applying said extract to the soil in which the plant is growing.

7. A method of making plants repellent to insects by treating the seeds of the plants comprising the steps of, forming a damp mixture of water and a plant material selected from the group consisting of blue lupines, privet and chinaberry, aging said mixture for two to four weeks thus bringing about a molding of the same, and inoculating the seeds of the plant to be made repellent with an extract of said molded mixture.

8. An inoculant for making a plant repellent to insects and the like resulting from the aging of a damp mixture of water and a plant material selected from the group consisting of chinaberry, blue lupines and privet for two to four weeks whereby the mixture is caused to become moldy.

9. The process of producing a seed and soil inoculant for making a plant repellent to insects and the like comprising, aging a damp mixture of water and a plant material selected from the group consisting of chinaberry, blue lupines and privet for two to four weeks whereby the mixture is caused to become moldy.

References Cited in the file of this patent

UNITED STATES PATENTS

| | | |
|---|---|---|
| 1,686,964 | Eggert | Oct. 9, 1928 |
| 2,313,057 | Fischer | Mar. 9, 1943 |

FOREIGN PATENTS

| | | |
|---|---|---|
| 249,830 | Great Britain | Feb. 18, 1926 |

OTHER REFERENCES

Ser. No. 393,301, Betting (A. P. C.), published June 1, 1943.

"Insect Control" (Wardle et al.) published by Univ. Press (Manchester, England) 1923 as Biological Series No. 3; pages 98, 99.

Dept. Bul. 1312, published Jan. 27, 1925 by U. S. Dept. Agr., on "Loss of Nicotine," pages 13 and 14.

Harnim Das Bhasin: Chemical Abstracts, vol. 21, page 2754 (1927).

Isaev: Chemical Abstracts, vol. 36, column 5606 (1942).

"Fatty Acid Antibacterials from Plants." Chemical Abstracts, vol. 44, cols. 695, 696 (1950).

"Chemical Control of Insects" (West et al.) published by Chapman & Hall (London) 1951. Pages 48, 49, 59.